J. Pepper.
Knitting Mach.

No. 1,538

Reissued Sep. 15. 1863

J. Pepper.

Sheet 2. 3 Sheets.

Knitting Mach.

No. 1538

Reissued Sep 15. 1863

J. Pepper.
Sheet 3-3, Sheets.
Straight Knitting Mach.
No. 1,538.
Reissued Sept. 15, 1863.
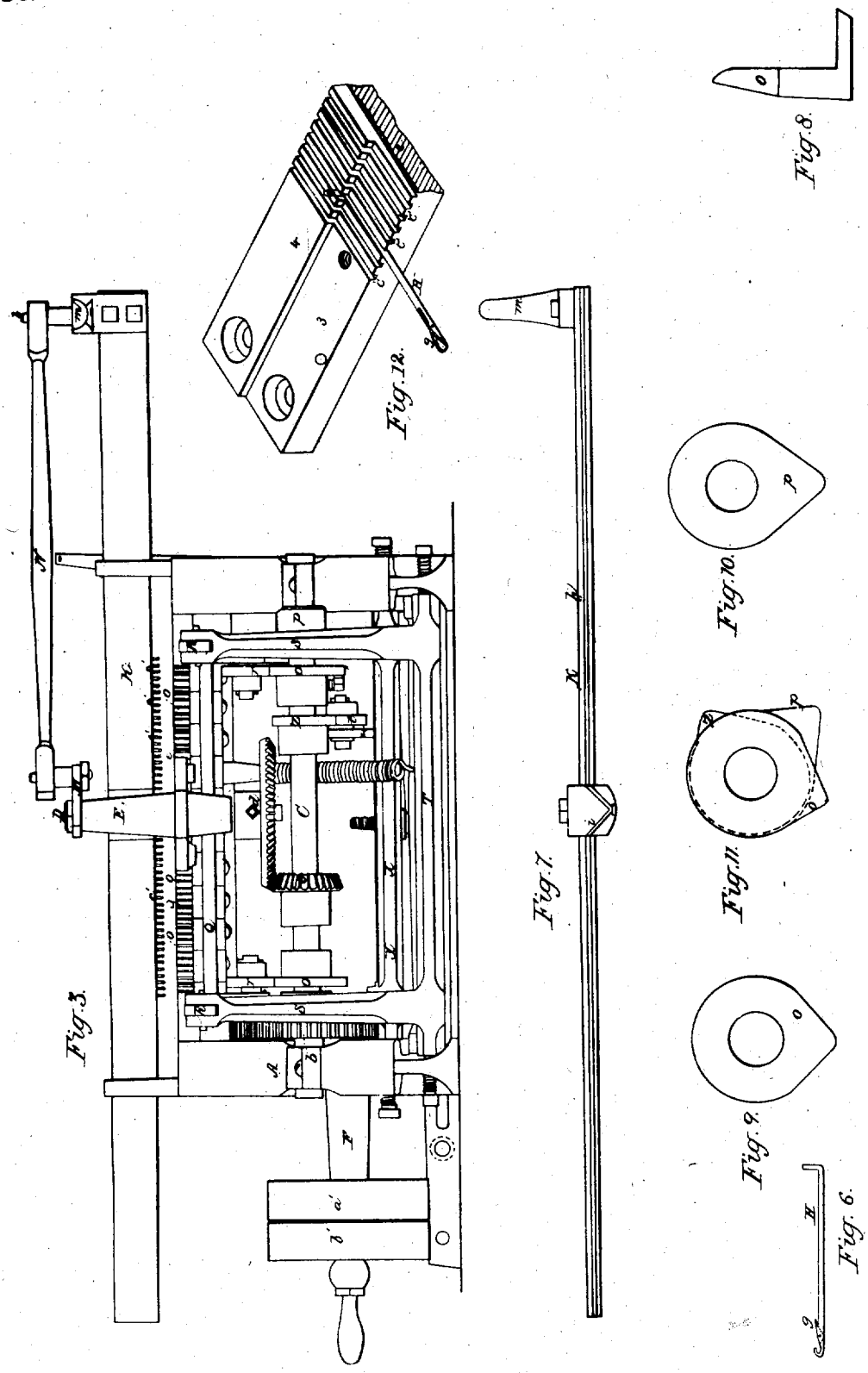

UNITED STATES PATENT OFFICE.

JOHN PEPPER, OF HOLDERNESS, NEW HAMPSHIRE.

IMPROVEMENT IN KNITTING-MACHINES.

Specification forming part of Letters Patent No. 13,289, dated July 17, 1865; Reissue No. 1,538, dated

*To all whom it may concern:*

Be it known that I, JOHN PEPPER, of Holderness, in the county of Grafton and State of New Hampshire, have invented a new and useful or Improved Machine for Knitting either Plain or Ribbed Fabrics; and I do hereby declare that the same is fully described and represented in the following specification and the accompanying drawings, letters, figures, and references thereto.

Figure 1:
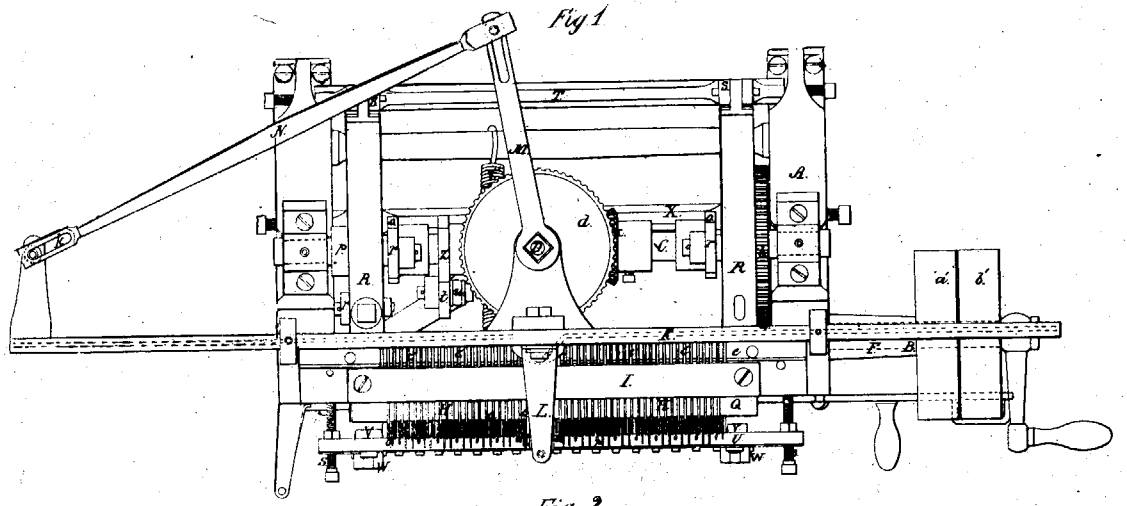
Figure 2:
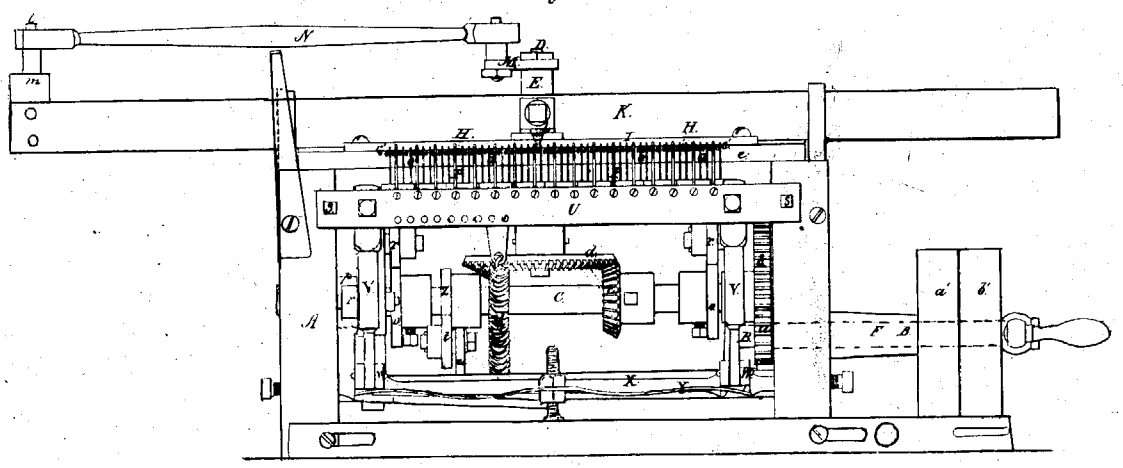
Figure 5:
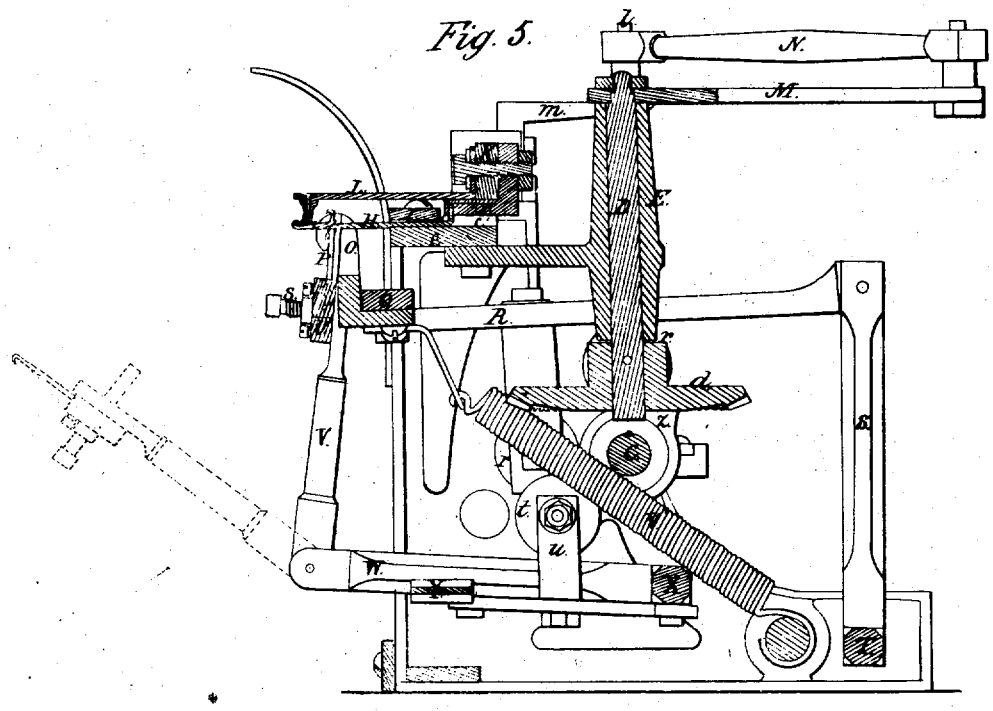
Figure 4:
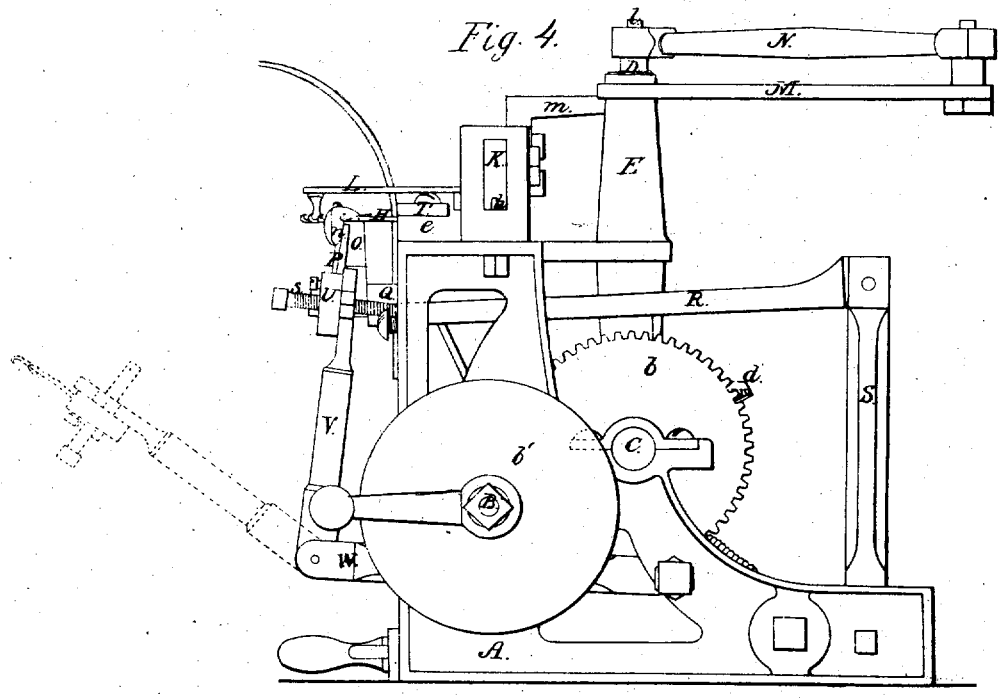

Of the said drawings, Figure 1 denotes a top view of my machine. Fig. 2 is a front elevation of the same. Fig. 3 is a rear elevation of it. Fig. 4 is an end view of it, the same being taken so as to exhibit that end at which the driving-pulley is situated. Fig. 5 is a transverse and vertical section taken through the upright crank-shaft, to be hereinafter described; Figs. 6, 7, 8, 9, 10, 11, and 12, details to be referred to hereinafter.

In these drawings, A exhibits the frame of the machine, it being constructed to carry or support a driving-shaft, B, a cam-shaft, C, and a vertical crank-shaft, D, which plays within an upright tube, E, arranged as seen in the drawings. The driving-shaft is exhibited in Figs. 1 and 2 as operating through a tube F, extending from one end of the machine, as shown in Figs. 1 and 2 by dotted lines. It carries a fast and loose pulley (see *a′ b′*) upon its outer end, while upon its inner end there is attached a pinion-gear, *a*, which engages with a larger gear, *b*, fixed upon the cam-shaft C. The two shafts C and D have engaging beveled gears *c d*, for the purpose of communicating motion from one to the other of them. The top bar, *e*, of the frame of the machine is stationary and provided with a series of transverse grooves, *c′ c′ c′*, for the reception of the hooked needles H H H, the said needles being arranged horizontally, and so that each can be capable of sliding longitudinally in one of the said grooves. The needles are kept in place by a cap-bar, I, which extends over them, and is screwed to the top bar, *e*, as seen in Figs. 1 and 2. Each needle has the rear end or part of its shank bent upward at right angles to the seat of the shank, as seen in Figs. 5 and 6, the latter figure being a side view of one of said needles. There is applied to the hook of each needle a closing self acting fly, *g*, it being a device well known and in common use.

The object of making the rear part of the shank of each needle to stand at right angles, or bent with respect to the shank, as described, is to enable such part to enter and work in the groove *h* of a sliding bar, K, an under side view of which is represented in Fig. 7.

The bar *e* is constructed with its rear thicker than its forward portion, 3, or elevated above it, as shown in Fig. 12, the upright or bent portion 5 of the needles H traversing in the thicker portion 4 of the bar, and thus the needles are prevented from rolling, and are preserved more exactly in their proper position than would be the case were the straight shank of the needle alone depended upon for the purpose.

The bar K supports the yarn-guide L, and is arranged above the needles, as seen in Fig. 1, 2, and 5, and is made to slide freely in a longitudinal direction, so as to carry the yarn-guide L across the series of needles. In the rear of and below the yarn-guide L the groove *h* is made V-shaped or angular, as seen at *i* in Fig. 7, the object of this being to impart to each needle a forward and backward movement, in order to enable it not only to seize the yarn, but to move its fly *g* forward beyond the stitch on the shank of the needle.

The sliding bar K has intermittent reciprocating longitudinal movements imparted to it, they being produced by means of a crank, M, and a slotted connecting-rod, N. The crank M projects horizontally from the upper part of the shaft D, one end of the connecting-rod being joined to the outer end of said crank. There is a slot, *k*, formed through the connecting-rod, as seen in Fig. 1, and made to receive a pin, *l*, extending upward from an arm, *m*, projecting from the sliding bar K. The object of the slot in the connecting-bar is to enable the bar K to be stopped in its movement while the sinkers are performing their motions. In connection with the needles I employ a series of sinkers, O O O. (See Figs. 1, 2, and 5.) Each of these sinkers, with the exception of those which are termed "cast-off sinkers," and lie directly back or behind the rib-needles P P P, is formed with a hook, as seen at *n*, Fig. 4, while each remaining or cast-off sinker is constructed without any such hook, or takes the form as shown in side view in Fig. 8. The several sinkers are affixed to a horizontal bar, Q, whose ends are attached to two bars, R R, which are respectively jointed to the upper ends of arms S S, projecting upward from a rocker-shaft, T, the same being as seen in the drawings. The sinker-bar h an upward and a forward motion imparted to it at suitable times, the upward motion being for the purpose of casting off the loops formed upon the front portions of the hooks of the sinkers. The forward motions of the sinkers is for casting the loops over the heads or hooks of the horizontal needles. These movements are produced by two sets of cams, *o p*, which are fixed upon the cam-shaft, as seen in the drawings, and are respectively made to operate against friction-rollers *r r r*, applied to the sides of the projections from the bars R R.

Fig. 9 is a side view of one of the cams *o*, while Fig. 10 is a side view of one of the cams *p*, their relative position on the shaft being exhibited in Fig. 11.

In connection with the series of needles hereinbefore described, I apply a set of rib-needles, P P P, which project upward from a horizontal bar, U. They are made to work between the sinkers, and each of them is disposed directly in front of some one of the cast-off sinkers, which is made without any hook, as hereinbefore explained. The bar U is provided at its two extremities with adjusting stop screws *s s*, whose inner ends abut against the frame-work, as seen in Figs. 1 and 2. The object of these screws is to adjust the rib-needles so as to vary the length of the rib-loops as circumstances may require. Such rib-needle bar is mounted upon posts V V, whose lower ends are hinged or jointed to arms W W, projecting horizontally, or thereabout, from a rocker-shaft, X, arranged as seen in the drawings. The said arms W W rest upon a steel spring, Y, by which they are elevated at a proper time, they being depressed by means of a cam, Z, fixed upon the cam-shaft C, and made to work against a roller, *t*, carried by a post or arm, *u*, extending from the rocker-shaft X. In Fig. 11 this cam and its relative position to the other cams are exhibited. The forward motion of the rib needle bar is effected by the forward movement and pressure of the sinker-bar Q, while the rearward movement of it is produced by the back draft of the sinker-bar on the work on the rib-needles, such sinker-bar being carried backward by a spring, V′, as seen in the drawings.

Having thus described the construction of my machine, I would remark that it is adapted to weaving either plain or ribbed work, as occasion may require. While plain work is being woven by it the rib-needles and their supporting-bar are turned downward into the position exhibited by dotted lines in Figs. 4 and 5.

The operation of the machine may thus be described: The yarn-guide, carrying the yarn, is first moved over the needles during and by the movements of the bar K. This operation lays the yarn in the hooks of the plain and rib needles and around the front ends of the hooked sinkers. Next, the sinkers rise up so as to cast off the yarn from the front parts of the hooks of those which are hooked, the rib-needles at the same time being made to move downward, so as to draw their loops through those that previously may have been formed on their shanks. Next, the sinker-bar is moved forward, so as to cast the stitches on the shanks of the plain needles over those in the hooks thereof. Next, the sinker-bar is moved downward, and catches the work in the throats of the sinkers and draws it downward, so as to carry the loops of the rib needles entirely below their flies. Thus, the several operations required in the construction of rib-work are successively carried on.

In the performance of plain work the operations of the horizontal or plain needles and those of the sinkers are essentially as hereinbefore described, the rib-needles being moved out of the way or turned downward, as hereinbefore mentioned. The shank of each of the sinkers that is made without a hook performs the same function in moving the work forward as does each of the shanks of the hooked sinkers. It does not perform any other function, or, in other words, it does not aid in the formation of loops or receive yarn from the yarn-guide, as do the hooks of the hooked sinkers. I therefore term each of the sinkers constructed without a hook a "cast-off sinker," in order to distinguish it from the hooked or loop-forming sinkers.

I claim—

1. The bar *e* with its grooves *c′*, having its rear elevated above its forward portion for the purpose of preventing the needle from rolling, as described.

2. In combination with the hooked sinkers and ribbed needles, made to operate substantially as described, the series of cast-off sinkers, or those formed without hooks, the same being arranged in the sinker-bar, and not only so as to admit the rib-needles to work between the hooked sinkers, but so as to render the machine capable of performing either plain or ribbed work, as specified.

3. Making the rib-needle take the place of the front or hook of the sinker in forming the loop for the rib-stitch.

JOHN PEPPER.

Witnesses:
J. L. WILSON,
S. M. WRIGHT.